July 15, 1952   L. B. BURNAM   2,603,134
CAMERA SUPPORT
Filed Sept. 8, 1948   2 SHEETS—SHEET 1
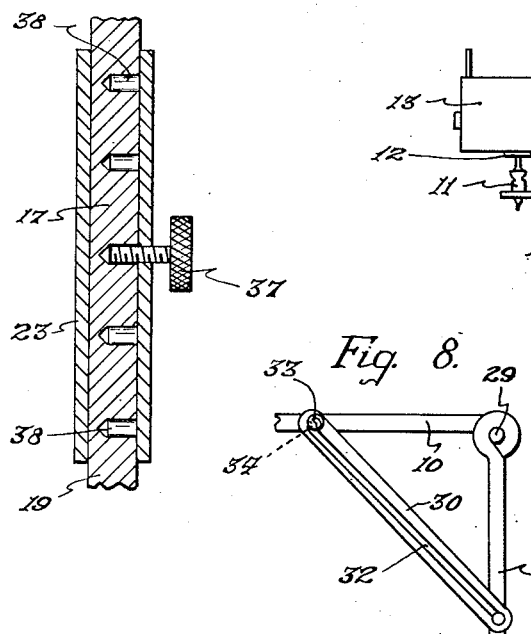
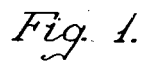
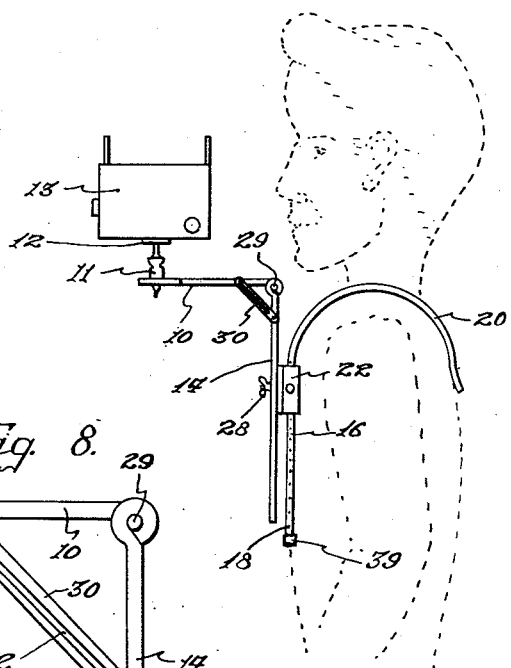
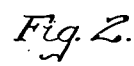
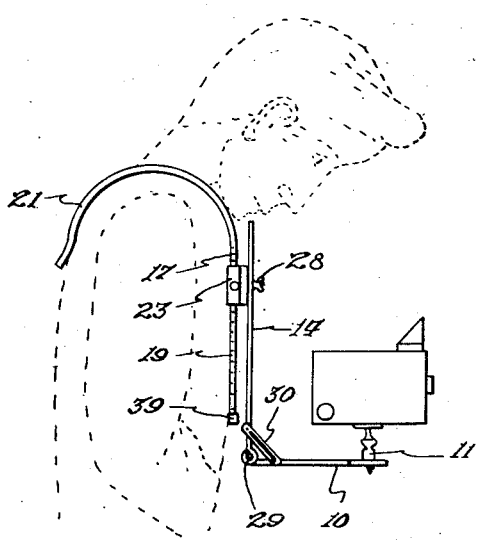
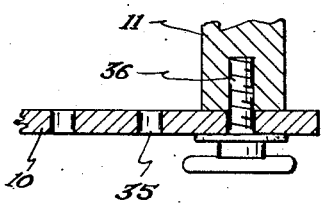
INVENTOR.
Lyman B. Burnam
BY
Smith & Wells July 15, 1952   L. B. BURNAM   2,603,134
CAMERA SUPPORT
Filed Sept. 8, 1948   2 SHEETS—SHEET 2
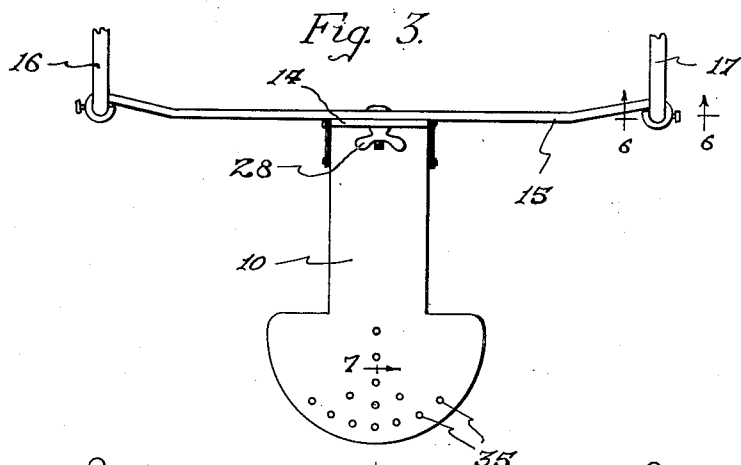
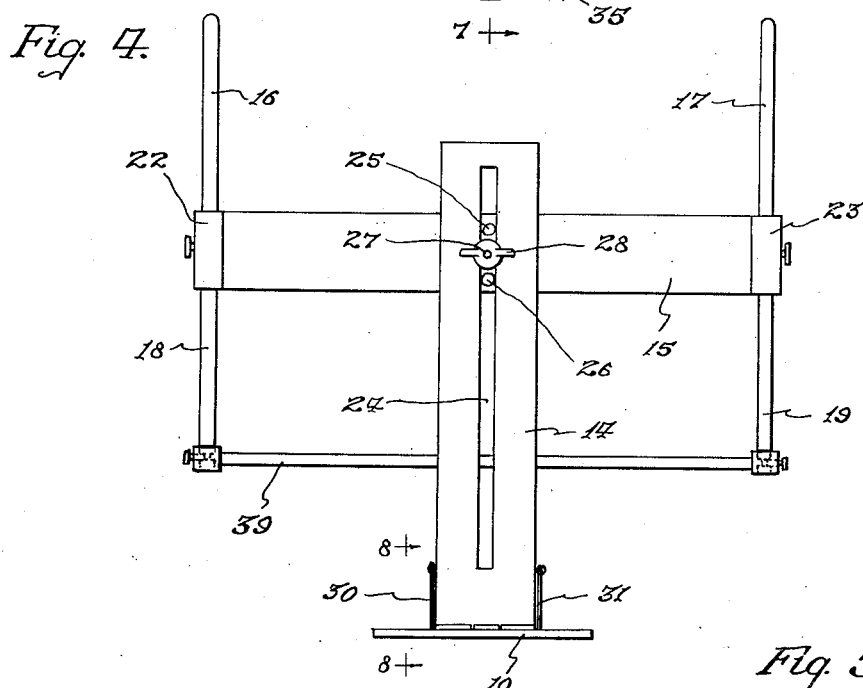
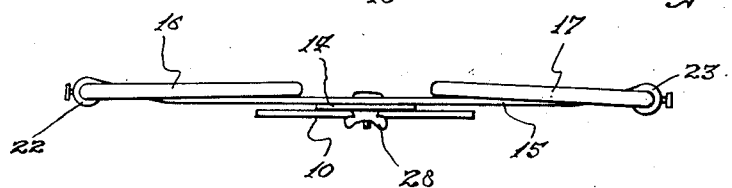
INVENTOR.
Lyman B. Burnam
BY Smith & Wells Patented July 15, 1952

2,603,134

UNITED STATES PATENT OFFICE 2,603,134

CAMERA SUPPORT

Lyman B. Burnam, Clarkston, Wash.

Application September 8, 1948, Serial No. 48,281

6 Claims. (Cl. 95—86)

The present invention relates to improvements in a camera support.

It is the principal purpose of my invention to provide a means whereby a camera can be supported at eye level or at waist level, from the shoulders of the operator, leaving both hands free for operation of the camera.

It is also a purpose of my invention to provide a device of this character which is so constructed as to permit it to be readily folded into a compact shape when not in use.

My invention also contemplates the provision of a device of this character wherein the change over from eye level to waist level positions can be quickly accomplished at the will of the operator. The device is constructed of a few simple parts which provide for a wide range of adjustment in order that the individual user of the device may fit it to his particular satisfaction.

The nature and advantages of my invention will appear more fully from the following description and accompanying drawings wherein a preferred form of the invention is shown. It should be understood however, that the drawings and description are illustrative only and are not to be considered as limiting the invention except insofar as it is limited by the claims.

In the drawings:

Figure 1 is a view in side elevation of the camera support showing it used to support the camera with the view finder thereof at eye level;

Figure 2 illustrates the device arranged to support the camera at waist level;

Figure 3 is a plan view of the camera support with the camera removed;

Figure 4 is a front face view of the camera support showing it arranged to hold the camera at waist level;

Figure 5 is a plan view similar to Figure 3 but showing the parts folded for carrying;

Figure 6 is an enlarged fragmentary sectional view taken on the line 6—6 of Figure 3;

Figure 7 is an enlarged fragmentary sectional view taken on the line 7—7 of Figure 3; and Figure 8 is an enlarged fragmentary sectional view taken on the line 8—8 of Figure 4.

Referring now in detail to the drawings, my invention provides a shoulder supported shelf on which a camera may be mounted by the usual mounting means employed for mounting the camera upon a tripod. I have found it a difficult matter in taking pictures, to hold the camera steady, particularly at eye level and to perform the other functions necessary in taking a picture for the reason that one hand at least is essential to support the camera. With the present device I can support the camera entirely from my shoulders, thus obtaining a steadier support than can possibly be obtained by holding the camera in one hand, and I have both hands free. The device comprises a shelf 10 which has a standard pedestal 11 which can be threaded into the tripod mounting plate 12 of a camera 13.

For some purposes, it is desirable to support the camera at waist level and in order to provide a device that works equally well for both purposes, I mount the shelf 10 upon an adjustable standard 14. The standard 14 is carried by a breast plate 15 which in turn is supported by a pair of shoulder clips 16 and 17. The shoulder clips 16 and 17 have straight portions 18 and 19 and curved portions 20 and 21. The curved portions fit over the shoulders as shown, and carry the weight of the camera support with the attached camera. The straight portions 18 and 19 extend through tubular guide portions 22 and 23 at the ends of the breast plate 15 and are adjustable therein in order to control the level of the breast plate with respect to the shoulders.

The standard 14 is mounted for vertical adjustment on the breast plate 15 by a slot 24 in the standard and guide posts 25 and 26 on the breast plate 15. In order to clamp the standard in vertical position at the proper level, I provide a screw threaded bolt or stud 27 on the breast plate and a wing nut 28 for engaging the standard and clamping it against the breast plate.

When the standard is to be changed from the position shown in Figure 1 to the position shown in Figure 2, it is only necessary to release the wing nut 28 far enough to permit the standard to turn about the stud 27 over the tops of the posts 25 and 26 until the camera supporting shelf 10 is below the breast plate and the slot 24 is again aligned with the posts.

The shelf 10 is hinged to the standard 14 by a hinge 29. Braces 30 and 31 are pivoted to the standard and are slotted as indicated at 32 to receive a pin 33 that is fixed on the shelf. The slot 32 is formed as shown in Figure 8, with a hooked portion 34 by which it can be latched in position to hold the shelf 10 at right angles to the standard 14.

As an example of the way in which the camera 13 is mounted at the desired position on the shelf 10, I illustrate in Figures 3 and 7, a series of apertures 35 in the shelf. Any one of these apertures may be used to mount the pedestal 11 by means of a headed screw 36 that extends up through the selected aperture 35 and threads into the pedestal 11. With this construction the operator may position the camera pedestal closer to or far away from his eye and to the right or left of the center line of the shelf as he may desire.

The adjustability of the shoulder clips must be such that the clips may be lengthened or shortened above the breast plate 15, but they must be held against turning, that is, swinging about their vertical portions to slide off the shoulders. This may be accomplished in various ways. One way is shown in Figure 6 wherein the sleeve 23 is threaded to receive a thumb screw 37 and the vertical portion 19 of the shoulder clip 17 is shown as provided with a series of sockets 38 into which the thumb screw can be extended. It is desirable from a protective standpoint to enclose the lower ends of the shoulder clips. This I accomplish by means of a cross bar 39 which fits over the ends of the shoulder clips and is secured thereto. This bar 39 may likewise serve to prevent rotation of the shoulder clip if desired. In that case, it is unnecessary to have the thumb screw 37 perform the function of preventing rotation. However, since the vertical adjustment must be provided to adapt the shoulder clips to people of various sizes, it is more convenient to provide the non-rotational feature by means of the thumb screw.

It is a simple matter to fold the device into a compact flat package when it is not in use. This is illustrated in Figure 5 of the drawings where the braces 30 have been reversed to allow the shelf 10 to fold up against the standard 14. The thumb screw 37 is turned back until the shoulder clip 16 and 17 can be rotated to lie against the breast plate 15. In this position all of the parts lie close to each other so that the device occupies very little space.

It is believed that the nature and advantages of my invention will be apparent from the foregoing description. Having thus described my invention, I claim:

1. A portable camera support comprising a pair of spaced apart shoulder clips, a breast plate having sleeves at its ends and slidably and rotatably mounted on said shoulder clips, a hinged platform, a slotted member slidably and pivotally mounted on said breast plate and extending upwardly and downwardly therefrom, said platform hinged from one end of said slotted member thereby providing a means for adjusting said platform to the wearer's eye elevation or to the wearer's waist elevation.

2. A portable camera support comprising a pair of spaced apart shoulder clips, a breast plate having sleeves at its ends and slidably mounted on said shoulder clips, a hinged platform, a slotted member slidably and pivotally mounted on said breast plate and extending upwardly and downwardly therefrom, said platform being hinged to said slotted member, a bar having short tubular parts fixed to its ends, said parts being fitted with set screws and apertures accommodating the notched ends of the shoulder clip extensions, said hinged platform being foldable up or down against said slotted member, said shoulder clips being foldable inwardly against said breast plate upon release of the set screws of the spacing rod thereby providing a two-elevation, adjustable camera support folding into a flat package.

3. A portable camera support comprising a pair of spaced apart shoulder clips, a breast plate having sleeves at its ends and slidably mounted on said shoulder clips, a slotted member slidably and pivotally mounted on said breast plate and extending upwardly and downwardly therefrom, a camera supporting platform hinged to the slotted member, a thumb screw member seated in the breast plate and extending through the longitudinal slot of said slotted member and slidably and rotatably mounting said slotted member on said breast plate thereby providing elevation adjustment means for said camera support platform.

4. A camera support device comprising a pair of rotatable shoulder clips, a spacing bar pivotally holding said clips apart, an adjustable breast plate adjustable up and down between said clips and fitted with a thumb screw member at its center, a longitudinally slotted member rotatably and slidably supported upon said breast plate by said thumb screw member, a camera support platform swingingly hinged to one end of said slotted member, the device being foldable into a flat package by said clips pivoting on said spacing bar and said platform pivoting on said slotted member and said camera support platform being adjustable to eye-level and waist-level by rotation about said thumb screw member.

5. In a portable camera support, a pair of spaced apart shoulder clips having straight shanks, a breast plate having sleeves at its ends, the shanks of said clips being rotatably mounted in said sleeves, a spacer bar pivotally connecting said clips, a slotted standard pivotally and slidably attached to said breast plate, a platform pivotally attached to said standard, pivotal and hinging means of folding said members into a flat package for portability, said means of folding comprising hinges connecting said platform to said slotted standard, a screw rotatably and slidably mounting said slotted standard upon said breast plate, means at the ends of the breast plate slidably and adjustably mounting said breast plate upon said shoulder clips and rotatably holding said clips apart, said clips being pivotally mounted in the ends of said spacing bar, and set screws fitted to the ends of said breast plate and the ends of said spacing bar thereby providing means of forming an adjustable rigid camera support platform from the portable flattened package.

6. A camera support device comprising a pair of rotatable shoulder clips, a breast plate having guides thereon through which the clips extend, the clips being slidable and rotatable in the guides, manually releasable means to hold the clips stationary in said guides, said breast plate having a central pivot stud projecting therefrom, a longitudinally slotted standard pivotally and slidably supported on said stud, means on the stud to clamp the standard to the breast plate, and a camera support platform swingingly hinged to the standard, the device being foldable into a flat package, by said clips pivoting on said breast plate and said platform pivoting on said standard, and said camera support platform being adjustable to eye-level and waist-level by rotation of the standard on the breast plate.

LYMAN B. BURNAM.

REFERENCES CITED

The following references are of record in the file of this patent:

UNITED STATES PATENTS

| Number | Name | Date |
|---|---|---|
| 1,018,771 | Neuburger | Feb. 27, 1912 |
| 1,130,689 | Atkinson | Mar. 2, 1915 |
| 2,370,611 | Du Mais | Feb. 27, 1945 |
| 2,495,265 | Krogman | Jan. 24, 1950 |